May 11, 1954
C. H. DICKE
2,678,432
THERMOSTAT
Original Filed March 13, 1946
2 Sheets-Sheet 1
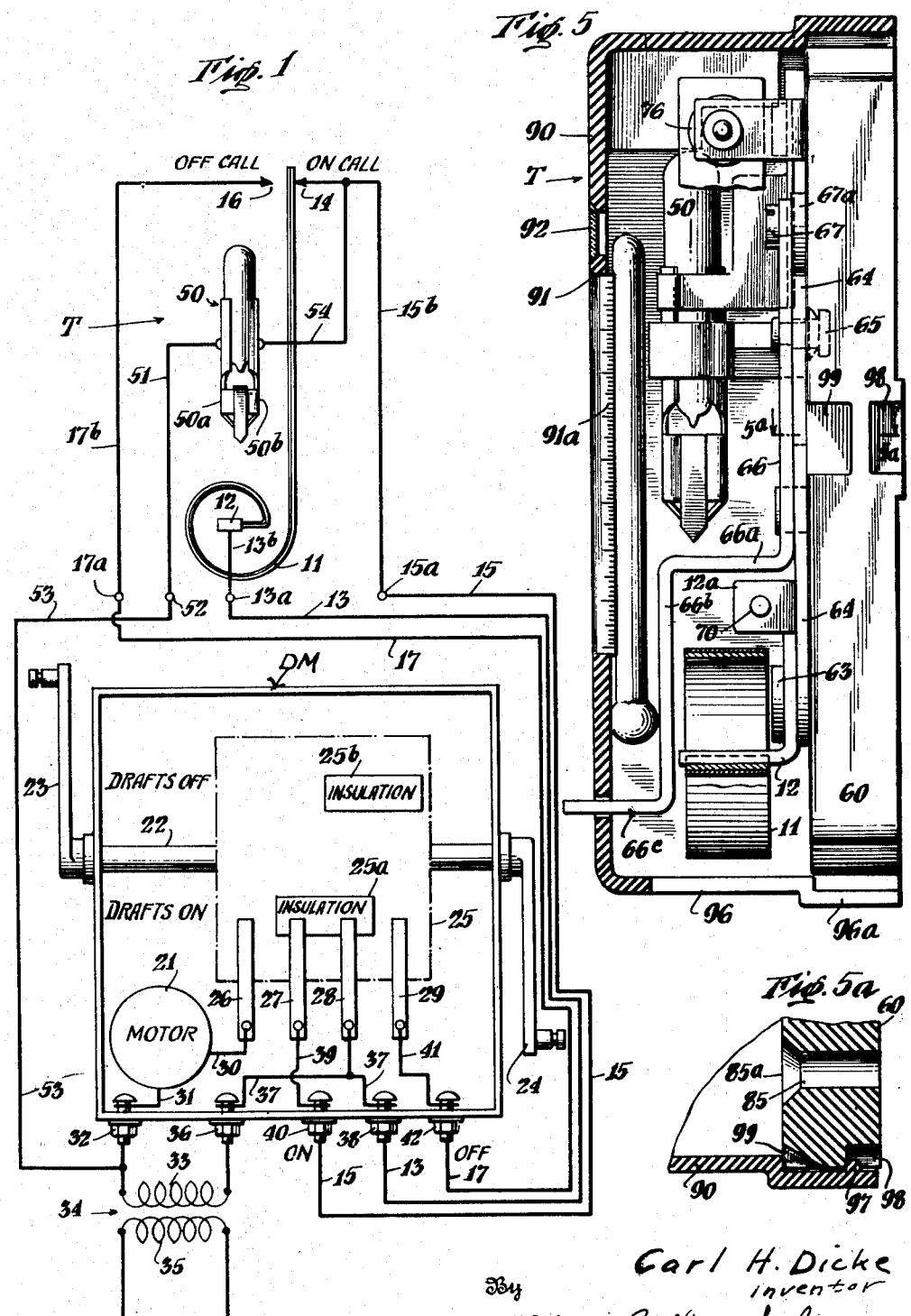
Carl H. Dicke
inventor
Dicke Padlon & Seeley, attorneys

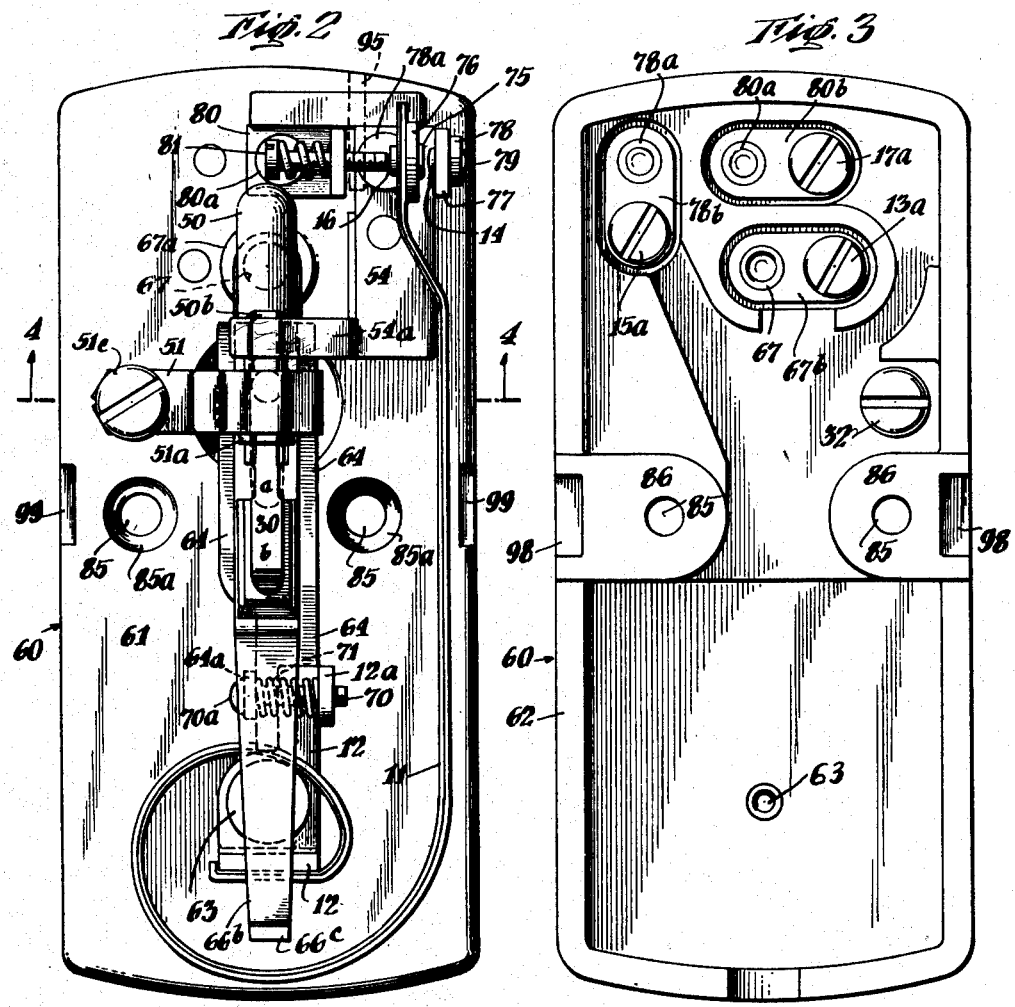
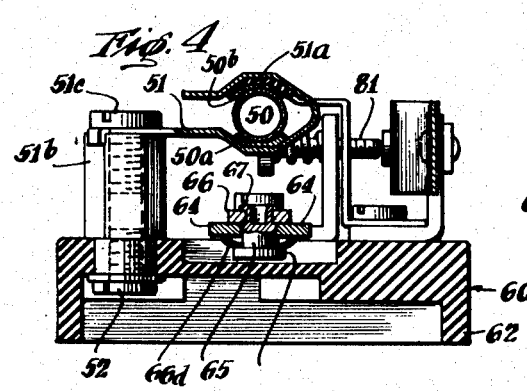
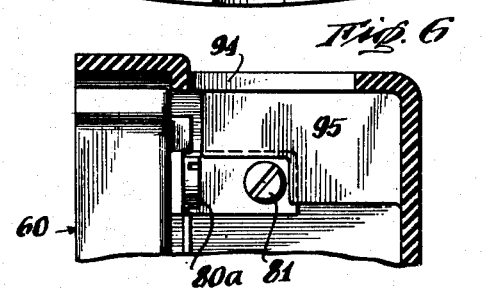

Patented May 11, 1954

2,678,432

UNITED STATES PATENT OFFICE 2,678,432

THERMOSTAT

Carl H. Dicke, New Bremen, Ohio, assignor, by mesne assignments, to Crown Controls Company, Inc., Bremen, Ohio, a corporation of Ohio Original application March 13, 1946, Serial No. 654,052. Divided and this application May 1, 1948, Serial No. 24,530

1 Claim. (Cl. 340—227)

This invention relates to improvements in thermostats and this application comprises a division of my application for patent Serial No. 654,052 filed March 13, 1946, now Patent No. 2,548,424, dated April 10, 1951. While many features of the present invention are applicable to various known temperature control systems, other features thereof are particularly adapted for use with the system disclosed and claimed in my application identified above.

An object of the present invention is to provide a thermostat having a lamp or other supplemental heat source associated therewith arranged in heat-conductive relation to the thermo-responsive element of such a thermostat and connected between the heat supply increasing contact of the thermostat and a conductor leading directly to an electric source so that the thermo-switch contacts may establish parallel circuits, one of which includes said lamp or heat source.

Other objects are to provide improved lamp mounting means, convenient and reliable adjustment means for such thermostats, convenient and reliable means for attaching the cover thereof, to provide effective signal-indicating means on the cover and to provide means to prevent dust collecting on the contacts.

Another object is to provide a lamp mounted within a translucent thermostat housing so that light therefrom is visible through the housing.

Another object of the invention is to so arrange the thermo-responsive element relative to the contacts that movement thereof due to temperature changes or due to changes in the thermostat setting adjustment means causes the contact surfaces to rub over each other to cause self cleaning.

Further objects and advantages of this invention will be apparent from consideration of the specification as illustrated by the accompanying drawings of possible embodiments of the invention, in which drawings:

Fig. 1 illustrates a temperature control system showing more or less schematically a thermostat embodying the signal means of the present invention connected to a heat supply controlling device, such as a damper regulator motor;

Fig. 2 is an elevational view of a room thermostat embodying the invention, the usual cover having been removed;

Fig. 3 is a rear elevational view of the structure of Fig. 2;

Fig. 4 is a cross-sectional view taken on the line 4—4 of Fig. 2;

Fig. 5 is a side view of the thermostat of Fig. 2 with the cover thereon, the cover being shown in generally vertical, longitudinal section, except that the upper part is shown in section taken to the right of the center of the instrument;

Fig. 5a is a fragmentary section of the base and cover;

Fig. 6 is a fragmentary vertical, longitudinal section of the thermostat shown in Fig. 5.

Referring to said drawings, the letter T indicates generally a room thermostat and the letters DM indicate generally a damper motor. The thermostat includes a thermo-responsive element, such as the coiled bi-metal element 11, carried by a bracket 12, which is connected through conductor 13b with terminal 13a, to which is connected conductor 13. 14 represents the "on call" contact, connected through conductor 15b with terminal 15a to which is connector conductor 15, and 16 represents the "off call" contact, connected through conductor 17b with therminal 17a, to which is connected conductor 17.

The heat supply control device may consist of a damper regulator motor of standard construction, or may comprise a relay for controlling an oil burner, or for controlling the operation of the motor of a stoker, or may be an electrically-operated gas valve. In the form shown, the heat supply control device consists of an electric motor 21 connected through suitable gearing (not shown) to drive, at a much reduced speed, the shaft 22, which carries cranks 23 and 24 for operating the draft and check dampers or valves of a heating plant. Usual or suitable commutating means are provided. This may take the form of a metal tube 25, shown in development in dotted lines, carried for rotation by shaft 22. It is formed with two insulating areas 25a and 25b. Cooperating with said tube are four brushes 26, 27, 28 and 29. Brush 26 is connected through conductor 30 with motor 21, the other side of which is connected through conductor 31 and terminal 32 to the secondary winding 33 of a transformer 34, whose primary winding 35 is connected to a suitable source of alternating current. The other side of the winding 33 is connected through terminal 36 and conductor 37 with brush 28 and with terminal 38, to which conductor 13 is connected. Brush 27 is connected through conductor 39 to "on" terminal 40, to which terminal is connected the conductor 15. Brush 29 is connected through conductor 41 with the "off" terminal 42, to which is connected the conductor 17.

50 indicates a signal device, preferably a small electric lamp which not only serves to indicate the condition of the heat supply controlling device, but also serves as a supplemental heat source for increasing the sensitivity of the thermostat, as will be described more fully hereinafter. Said lamp is connected through conductor 51 with a terminal 52, to which is connected conductor 53, the other end of which is connected to terminal 32 of the damper motor and thus to that side of the transformer secondary which is directly connected through conductor 31 with the motor 21. The other side of the lamp 50 is connected through conductor 54 with the "on call" contact 14.

Before describing the details of the thermostat, the functions and operation of the system itself, as shown in Fig. 1, will be described.

Fig. 1 shows the parts in position where the damper motor has moved to "drafts on" position in response to the call of the thermostat T, due to an electrical connection between bi-metal element 11 and contact 14. The operation of motor 21 has terminated as a result of the insulation 25a coming under brush 27. It will be noted, however, that a circuit is open from the transformer secondary 33, terminal 32, through conductor 53, terminal 52, conductor 51, through lamp 50, conductor 54, "on call" contact 14, bi-metal element 11, bracket 12, conductor 13b, terminal 13a, conductor 13, terminal 38, conductor 37, terminal 36 to the other side of the transformer secondary. This circuit is completed solely through the bi-metal element 11 contacting the "on call" contact 14 and the lamp will, therefore, continue illuminated as long as the thermostat is in the position shown. This condition is quite independent of the commutating means in the damper motor. During this time heat from the lamp 50 is conducted to the bi-metal element 11 and serves, together with a resulting rise in the temperature of the room, to cause the bi-metal element 11 to move to the left. This operation is preferably of the "snap action" type, so that the bi-metal leaves the "on call" contact 14 and immediately makes connection with the "off call" contact 16. This breaks the circuit through lamp 50 and causes it to be extinguished. The circuit is, however, completed from transformer secondary 33, terminal 32, conductor 31, through motor 21, conductor 30, brush 26, metallic tube 25, brush 29, conductor 41, terminal 42, conductor 17, terminal 17a, conductor 17b, "off call" contact 16, bi-metal 11, bracket 12, conductor 13b, terminal 13a, conductor 13, terminal 38, conductor 37, and terminal 36 to the other side of the transformer secondary. This energizes motor 21 and causes it to rotate shaft 22 to move the damper motor to "drafts off" position. As soon as the insulation 25a moves from under both brushes 27 and 28, the lamp 50 will be energized through the circuit comprising conductor 53, terminal 52, conductor 51, lamp 50, conductor 54, conductor 15b, terminal 15a, conductor 15, terminal 40, conductor 39, brush 27, metallic tube 25, brush 28, conductor 37, and terminal 36 back to the other side of the transformer secondary. This circuit will be maintained only until insulation 25b moves under brush 28 at the end of the operation to the "drafts off" position of the damper motor. With the transformer 34 of the size usually used, the voltage of its secondary winding 33 is considerably reduced, due to the current flowing through motor 21. Therefore, while the lamp 50 is illuminated during the operation of the damper motor from the "drafts on" to the "drafts off" position, the lamp will not be fully illuminated, but only partially. The damper motor is now in the "drafts off" position and the lamp 50 is extinguished, due to the bi-metal element 11 not being in contact with the "on call" contact 14.

If now, the temperature drops, or for any other reason bi-metal 11 is moved from the "off call" contact 16 to the "on call" contact 14, the lamp will be immediately illuminated through the circuit including bi-metal element 11, as previously described. During the operation of the damper motor from "drafts off" to "drafts on" position, the lamp will be dimly illuminated, due to the voltage drop in the transformer secondary. However, at the end of the operation, the lamp will be illuminated brightly and will remain illuminated, thus signalling to the user that the damper motor is in "drafts on" position. During this time the heat radiated by lamp 50 affects bi-metal element 11 and causes it to move from "on call" contact 14 to the "off call" contact 16 earlier than it would do otherwise, so that the sensitivity of the thermostat is increased thereby. It will be noted also that while the motor 21 is operated to either the "drafts off" or the "drafts on" position, the lamp 50 will be illuminated dimly and thus signal to the user that a change in draft position is taking place. The novel system just described has the advantage that the illumination of the signal lamp 50 is controlled by the thermostat bi-metal itself and is independent of the particular type of commutator, if any, which may be present in the heat supply control device with which it is employed.

The thermostat

The thermostat illustrated in Figs. 2 to 6, inclusive, comprises a base 60 formed of a suitable insulating material, preferably of molded plastic material, having a forward face 61 and shown as formed with rim 62 extending rearwardly therefrom. Pivotally mounted as upon the rivet 63 is the bracket 12 supporting the bi-metal element 11. Also mounted on rivet 63 and directly under the horizontal portion of bracket 12 is the shifting fork member 64, extending upwardly therefrom and being split near its upper end, as appears from Fig. 4, to receive a rivet 65 having a head 65a, against which bears a cupped spring washer 66d, the outer rim of which bears against the forked portion of member 64. The rivet 65 is carried by the adjusting lever 66, which overlies the shifting fork 64 and is pivoted by means of screw or rivet 67. The adjusting lever has an outward extension 66a (see Fig. 5) to which is attached the vertical extension 66b, carrying, in turn, the horizontal extension 66c, which projects through the cover and provides a manually adjustable member which also serves as a pointer to indicate the setting of the instrument through the agency of the usual scale (not shown) on the front of the cover. The bracket 12 is provided with a projection 12a threadably receiving an adjusting screw 70, the head 70a of which bears against a projection 64a, forming part of the shifting fork 64. Interposed between the members 12a and 64a is a coiled spring 71, tending to force said members apart. By turning screw 70, the position of the bracket 12 relative to the shifting fork 64 may be readily adjusted.

In the form shown, the upper end of the bi-metal element 11 is provided with a contact rivet 75, which may conveniently serve to attach to the element 11 a soft steel washer 76, serving as an armature for a permanent magnet 77 supported upon a contact bracket 78 by means of a rivet 79 of good contact material, one end of which comprises the "on call" contact 14, shown schematically in Fig. 1. The contact bracket 78 is attached to the base by means of rivet 78a. 80 indicates another contact bracket attached to the base by rivet 80a. It carries a contact screw 81 formed with a contact point 16, forming the "off call" contact 16 shown in Fig. 1. The bi-metal thermo-responsive element 11 is so arranged that when its temperature rises the upper end of its contact blade portion tends to move toward the left, viz., toward contact 16, and toward the right upon a decrease in temperature. Since the coil portion of the element 11 is located and supported in an offset relation to the contacts 14 and 16, it will be obvious that when bracket 12 is shifted about the axis of rivet 63 the free end of the blade portion of 11 will be given an oblique motion with respect to the contacts 14 and 16 so that after the blade has shifted from one of said contacts to the other it will be caused to slide thereon thus rubbing off any lint, dirt or oxide or the like. This self-cleaning action at the contacts also takes place as an incident to temperature changes.

The lamp 50 is conveniently supported by means of a spring clip 51, which forms the conductor 51 shown in Fig. 1. Said clip surrounds the lamp 50, which may be of the usual telephone signal lamp type and makes contact with the contact terminal 50a of the lamp. Contact with the other terminal 50b of the lamp is prevented by the insulating material 51a. The clip 51 is shown supported upon a metal post 51b by means of screw 51c. It is imbedded in the base 60 and receives at its other end the terminal screw 52, corresponding to the terminal 52 of Fig. 1.

The other terminal 50b of the lamp is contacted by means of the conducting piece 54, corresponding to the conductor 54 in Fig. 1, which is provided with a contact finger 54a bearing on lamp contact 50b, and is held in place by the rivet 78a, and is, therefore, in electrical connection with the "on call" contact 14. It will, therefore, be seen that through the means shown, the lamp 50 is connected in the circuit in the manner indicated schematically in Fig. 1.

It will also be seen that the lamp 50 may be readily replaced by removing the screw 51c, whereupon the burned out lamp, together with its clip 51, may be removed and replaced by another lamp and clip. The lamp, clip, and insulating material 51a will, therefore, form a separate article of manufacture.

The openings 85 in the base, preferably flared as at 85a, serve to receive attachment screws for securing the thermostat base to a wall. For this purpose, the base is formed solid adjacent said holes, as indicated at 86 in Fig. 3. These lugs serve to support the pressure of the holding screws whereby distortion of the base is prevented.

By referring to Fig. 3, it will be noted that rivet 78a, after passing through the base material, also passes through a terminal link 78b, which serves as a riveting washer. At its other end it is formed with a threaded opening to receive the terminal screw 15a. Similarly, rivet 80a is riveted through terminal link 80b, which carries the terminal screw 17a. Likewise, the pivot rivet 67 is riveted into terminal link 67b, which carries the terminal screw 13a. By referring to Figs. 2 and 5, it will be noted that the base 60 is formed adjacent the rivet 67 with a raised boss 67a against which the adjusting lever 66 bears. This provides clearance under the lever 66 to accommodate the forked lever 64.

Referring to Fig. 5, it will be noted that a cover 90 is provided. This serves to protect the mechanism and carries, in the usual manner, a thermometer tube 91 adjacent the thermometer scale 91a on the face of the cover. The cover is preferably of translucent material so that light from the lamp 50 may illuminate the cover generally. It is preferred, however, to provide a window 92 of suitable colored translucent plastic or glass to make the light from lamp 50 more readily visible. The upper end of the cover 90 is provided with a preferably centrally located opening 94 (Fig. 6). Adjacent said opening a baffle 95 is preferably provided to shield the contact points from dust, which might otherwise settle thereon. The location of this baffle is indicated in dotted lines in Fig. 2. A corresponding opening or openings 96 are formed at the bottom of the cover. At least one of these openings, as shown at 96a, extends to the bottom of the cover to provide flexibility of the cover when applying or removing it from the base. The cover is held in place on the base by any suitable means, such as a small lug 97 (Fig. 5a) formed on the inside of the cover, which lug engages behind the shoulders 98 formed in the base. To facilitate application of the cover and to cause it to be sprung apart during application to the base, the base is preferably formed also with recesses 99, having inclined faces. During the application of the cover, the lugs 97 bear against the inclined faces 99, causing the cover to be spread apart. The lugs 97 thereupon spring in place behind the shoulders 98. The lugs 97 and the edge of the shoulders 98 are rounded so that it will be possible to withdraw the cover. By placing the recesses 98 at the extreme bottom of the base, the formation thereof presents no difficulties in the molding operation, since they may be formed by a corresponding extension on the mold. Similarly, the molding of the cover with lugs 97 thereon presents no difficulties, since the cover is sufficiently elastic to permit the lugs 97 to be forced out of corresponding recesses in the mold when the cover is stripped from the mold core.

It will be noted that the construction shown and described will serve admirably to accomplish the objects stated above. It is to be understood, however, that the constructions disclosed above are intended merely as illustrative of the invention and not as limiting as various modifications therein may be made without departing from the invention as defined by a proper interpretation of the claim which follows.

I claim:

In a thermostat, a thermo-responsive element, a switch including a contact arm actuated by said element and a pair of opposing contacts alternatively engaged by said arm, a first terminal electrically connected to one of said pair of contacts, a second terminal electrically connected to the other of said pair of contacts, a third terminal electrically connected to said contact arm, a lamp in thermal relation to said thermo-responsive element, one side of said lamp being electrically connected to said first terminal, a fourth terminal electrically connected to the other side of said lamp, a continuously closed circuit between said fourth and third terminals, and control means having opposing extremes of motion in which said first and second terminals are respectively and alternatively included in said closed circuit, both said first and second terminals being included in said closed circuit in intermediate positions of said control means.

References Cited in the file of this patent

UNITED STATES PATENTS

| Number | Name | Date |
|---|---|---|
| 1,583,496 | Shafer | May 4, 1926 |
| 1,847,034 | Phelan | Feb. 23, 1932 |
| 1,857,202 | Lee | May 10, 1932 |
| 1,874,116 | Persons | Aug. 30, 1932 |
| 1,874,117 | Persons | Aug. 30, 1932 |
| 1,875,369 | Colman | Sept. 6, 1932 |
| 2,030,933 | Persons | Feb. 18, 1936 |
| 2,101,637 | Davis | Dec. 7, 1937 |
| 2,208,432 | Samuels | July 16, 1940 |
| 2,279,305 | Drake | Apr. 14, 1942 |
| 2,279,544 | White | Apr. 14, 1942 |
| 2,448,776 | Crise | Sept. 7, 1948 |